S. W. Davis,
Horse Power.

No. 86,061. Patented Jan. 19, 1869.

Witnesses:
W. C. Ashfield
Wm. A. Morgan

Inventor:
S. W. Davis
per Munn & Co.
Attorneys

S. W. DAVIS, OF BRASHER FALLS, NEW YORK.

Letters Patent No. 86,061, dated January 19, 1869; antedated January 8, 1869.

---

IMPROVED HORSE-POWER.

---

The Schedule referred to in these Letters Patent and making part of the same.

---

*To all whom it may concern:*

Be it known that I, S. W. DAVIS, of Brasher Falls, in the county of St. Lawrence, and State of New York, have invented a new and improved Horse-Power; and I do hereby declare that the following is a full, clear, and exact description thereof, which will enable those skilled in the art to make and use the same, reference being had to the accompanying drawings, forming part of this specification.

This invention relates to a new and improved method of constructing horse-powers, whereby the friction is greatly diminished, and the same are rendered more durable, and are worked by less power and with less fatigue to the horse or horses, and whereby, also, the same are more completely under control.

It consists of an endless platform, in the common form, engaging with the teeth of a wheel or wheels, so that when the platform is moved backward by the walking of the horses, the said wheels are made to rotate, said platform being supported by endless chains supporting rollers, said chains and rollers moving by friction from a drum or drums, to which said wheels are secured, in a direction parallel to and coincident with said platform, said chains and rollers being supported under the upper part of the same by suitable tracks or railways secured to the frame of the machine.

It consists also of guide-shoes, supported by a cross-piece secured to the frame, by means of which the said chain and rollers are guided upon said drums.

It consists also of a double-acting brake, in combination with the governor-wheel and said-endless platform, by means of which the speed of the machine is stopped or lessened.

In the accompanying plate of drawings—

Similar letters of reference indicate corresponding parts.

Figure 1:
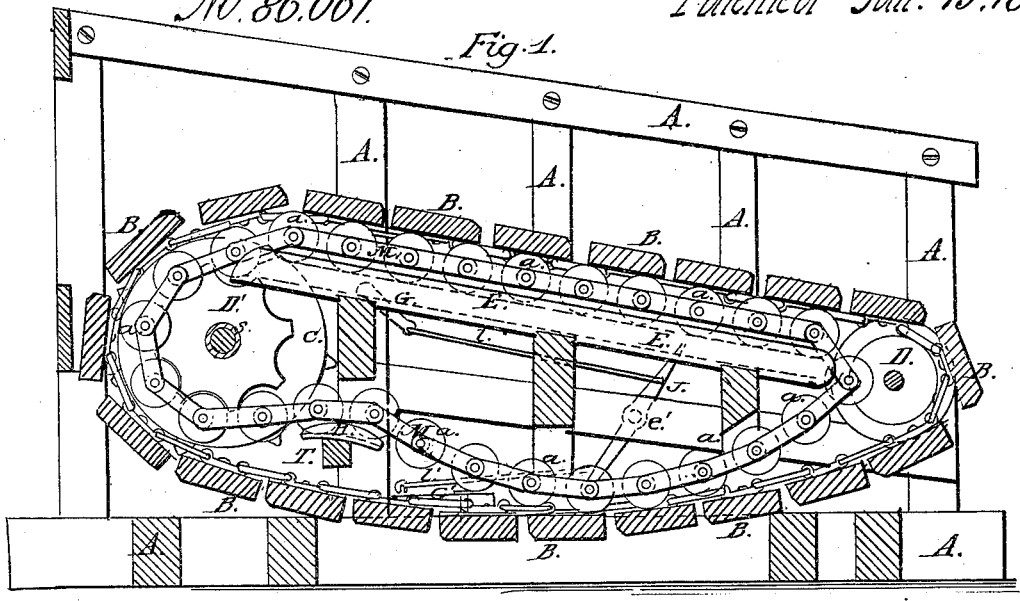
Figure 1 is a plan view of my invention.

A is the frame.

B is the endless platform.

M are endless chains supporting rollers $a$.

$a$ are friction-rollers in chain M.

E are tracks or railways on which rollers $a$ are supported.

C are toothed wheels.

D′ are toothed drums, or pulleys, by means of which the endless chains M and rollers $a$ are moved.

W is a governor-wheel.

G is a brake pivoted to the frame A, by means of which, bearing on the wheel W, greater friction is produced.

L is a connecting-rod, connecting brake G to lever J.

I is a brake, pivoted to frame A by pivot $a^2$, by means of which friction is produced, tending to stop the motion of platform B.

$l$ is a connecting-rod, connecting brake I to lever J.

H are guide-shoes, to guide rollers $a$ upon the drums D′ D′.

T is a bar or support for shoes H.

D is a guide-roller.

G is a brake pressing against the endless platform B.

The frame A is constructed in the ordinary way of constructing the frames for horse-powers, operated by the horse or other animal, walking upon an endless platform moving backward under its feet.

Upon one or the front end of the said frame A, at sufficient height to give room, and supported in suitable bearings, is a main shaft, S.

Upon each end of said shaft S, and within the frame A, are the toothed wheels C.

Said wheels C are of any convenient diameter, and are provided, on the circumference of the same, with projections or teeth, which engage in the links of endless chains, said links of said chains supporting the cross-bars or footholds which form the endless platform B, in the ordinary way, as shown, said platform B passing over a guide-roller, D, at the other end of the frame A, as shown.

Upon each end of the shaft S, and within the wheels C, are two toothed drums or pulleys D′, to receive the rollers $a$, as shown, and by means of which said drums D′, and said rollers $a$, engaging in the teeth or grooves in the same, the continuous rotating motion of the shaft G is communicated to the chains M, and rollers $a$ in the same, as from a drum or pulley to a belt, said endless chains M and rollers $a$ passing over one end of the railways E, as shown in the other end of the frame A.

Said drums D′ are provided with grooves, so as to form teeth or projections on the same, the width of said grooves being nearly equal to the diameter of said rollers $a$, so that each of said rollers will occupy a groove in the said drums D′ successively, as said rollers are drawn along, by the action of the platform B, over the drums, which run loosely on the shaft S.

The chains M are endless chains, containing the said rollers $a$ between two endless chains, said rollers turning upon the rivet or pin by means of which the links of said chains are secured together, said two endless chains, and the rollers between the same, forming only one of the endless chains M upon the drums D′.

Each of the drums D′ has its own endless chain M, so as to form the two endless chains M, with rollers $a$ moving parallel to each other around said drums D′, and around the ends of the tracks or ways E, as shown.

Upon the frame A, and under, so as to support the chains M and rollers $a$, inclined to the proper inclination to be given to the endless platform B, are two parallel tracks or ways E, of proper width to receive the rollers $a$, as shown, for the support of the chains M and rollers $a$.

The endless platform B is supported upon the rollers $a$, wheels C, and drum D, and communicates motion to the shaft S through the wheels C, from which shaft motion may be communicated to the machinery to be operated by the power, and said rollers $a$ rest upon and are supported by the wheels D' and the ways or tracks E, which are of sufficient strength to support the horses or other animals upon the endless platform B.

The said ways or tracks E run along between the sides of the frame A, parallel to the said frame A, and extend from the drums D' near to the guide-wheel D.

Upon two of the posts of frame A, and extending across between the upper and lower parts of the endless platform B, from one of said posts to the other, behind the drums D', is a bar or support, T.

Upon said bar or support T, and directly under the rollers $a$, to receive the same, one under each of the chains M, and so as to bend up the chains M and rollers $a$, and press the same against the under side of the drums D', and so as also to guide the rollers $a$ upon said drums D', are the shoes H.

Figure 2:
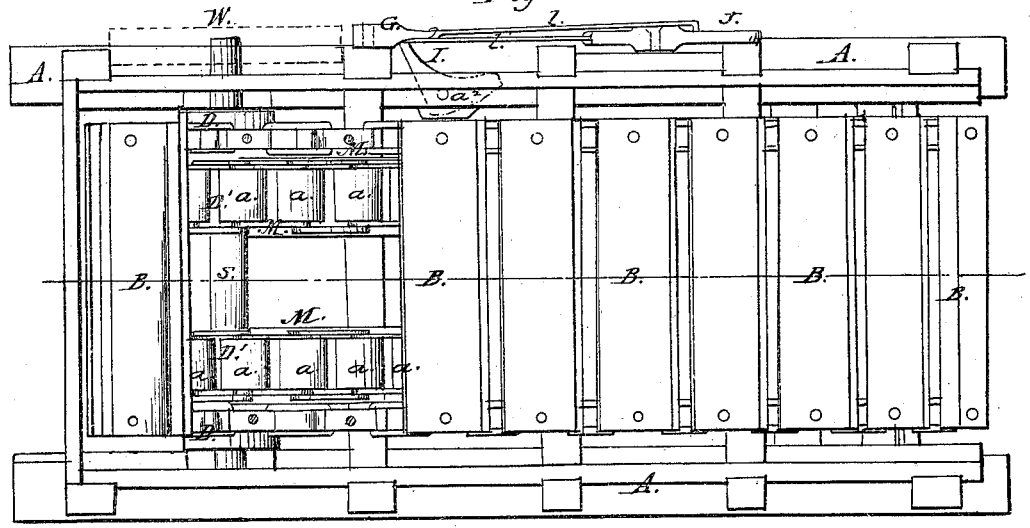
Figure 2 is a side view of the same, portions of the frame being broken away to show the construction.

Upon one end of the shaft S, outside the frame A, is a governor-wheel, W, shown in red in the drawing, fig. 2.

Upon the same side of the frame A as said wheel, and on the outside of the frame A, is a brake, G, pivoted to the frame A in such a way as, when operated, the short arm of the same will press against the circumference of the wheel W, as shown, the object of which is to produce so great friction between said brake G and wheel W as to stop the machine when necessary.

Upon said frame A, and upon the same side thereof as the brake G, and between the same and the guide-wheel D, is a lever, J, as shown.

To the upper or longer arm of the same the brake G is attached, by the connecting-rod $l$ engaging with the longer arm of the brake G, below the pivot on which the same turns.

Upon the lower or under part or support of the frame A is pivoted another brake, G', so arranged as that the short arm of the same will press against the edge of the endless platform B, so as, when operated, to increase the friction between said endless platform B and said brake G'.

To the lower or shorter arm of the lever J is attached a connecting-rod, $l'$, said connecting-rod $l'$ being attached, by the other end, to the longer arm of the brake G', in such a way that by one movement of the lever J the brake G will be applied to the wheel W, and by the reverse motion the brake G' will be applied to the endless platform B, and so also as, when in a vertical position of the lever J, neither of the brakes, G or G', will be applied, the object of which arrangement being such that in case of any injury to the wheel W or the brake G, or any of the connections, the brake G' may be applied to the endless platform B, to stop the machine.

The operation is readily seen from the drawing, being similar to that of horse-powers now in common use.

It may be made of wood or iron, or of wood and iron combined, in the ordinary way.

Constructed as above described, it constitutes a safe and reliable horse-power, the advantages of which are that the same is operated with less friction, and consequently less power, and also that the speed of the same may be more easily and surely controlled.

I claim as new, and desire to secure by Letters Patent—

1. The improved horse-power, substantially as shown and described, as and for the purposes set forth.

2. The parallel endless chains, consisting of short rollers and links $a$, operated by the toothed drums D', and supported by the parallel ways E and transverse shoe H, and the endless platform B, operated by the toothed drums C, all arranged as described, for the purpose specified.

3. The shoes H, in combination with the frame A and chains M, and rollers $a$ and drums D', substantially as shown and described, and for the purposes set forth.

4. The arrangement of the brakes G G', connecting-rods $l\ l'$, and lever J, with relation to the fly-wheel W and lower edge of the endless platform B, whereby said brakes operate alternately upon the edge of the endless platform and the periphery of the fly-wheel, as herein described, for the purpose specified.

S. W. DAVIS.

Witnesses:
C. W. DAVIS,
S. C. DAVIS.